United States Patent

Kraiczyk et al.

[11] Patent Number: 5,844,524
[45] Date of Patent: Dec. 1, 1998

[54] ANTENNA, IN PARTICULAR FOR AN ANTI-THEFT SYSTEM OF A MOTOR VEHICLE

[75] Inventors: Josef Kraiczyk, Regensburg; Johannes Kroitzsch, Erlangen, both of Germany

[73] Assignee: Siemens Aktiengesellschaft, Munich, Germany

[21] Appl. No.: 837,013

[22] Filed: Apr. 11, 1997

[30] Foreign Application Priority Data

Apr. 11, 1996 [DE] Germany ............ 196 14 362.4

[51] Int. Cl.⁶ .................................................. H01Q 1/38
[52] U.S. Cl. ............................ 343/700 MS; 343/713; 343/830; 343/846; 333/239
[58] Field of Search ................ 343/702, 767, 343/818, 749, 795, 700 MS, 770, 754, 769, 706, 872, 912, 873, 895; 333/239

[56] References Cited

U.S. PATENT DOCUMENTS

| | | | |
|---|---|---|---|
| 3,633,206 | 1/1972 | McMillan | 343/754 |
| 3,870,977 | 3/1975 | Peoples et al. | 333/84 R |
| 4,320,402 | 3/1982 | Bowen | 343/700 MS |
| 4,918,411 | 4/1990 | Staehlin | 333/239 |
| 5,041,838 | 8/1991 | Liimatainen et al. | |
| 5,757,326 | 5/1998 | Koyama | 343/702 |

FOREIGN PATENT DOCUMENTS

| | | |
|---|---|---|
| 0 547 563 A1 | 6/1993 | European Pat. Off. |
| 0 651 458 A1 | 5/1995 | European Pat. Off. |
| 0 750 364 A2 | 12/1996 | European Pat. Off. |
| 3517858A1 | 11/1985 | Germany . |
| 3721822C1 | 11/1988 | Germany . |
| 9115582.7 | 2/1993 | Germany . |
| 4302387A1 | 8/1993 | Germany . |
| 4205084A1 | 9/1993 | Germany . |
| 2 147 744 | 5/1985 | United Kingdom . |
| 2 152 757 | 8/1985 | United Kingdom . |
| 2 252 676 | 8/1992 | United Kingdom . |

Primary Examiner—Frank G. Font
Assistant Examiner—Layla G. Lauchman
Attorney, Agent, or Firm—Herbert L. Lerner; Laurence A. Greenberg

[57] ABSTRACT

An antenna is constructed as an "on-board antenna" in the form of conductor tracks on a circuit board. A conductor track on the upper surface of the circuit board is electrically connected to a conductor track on the lower surface thereof through plated-through holes. This increases both the effective antenna surface area and thus the radiation power.

8 Claims, 1 Drawing Sheet

5,844,524

ANTENNA, IN PARTICULAR FOR AN ANTI-THEFT SYSTEM OF A MOTOR VEHICLE

BACKGROUND OF THE INVENTION

Field of the Invention

The invention relates to an antenna, in particular for an anti-theft system of a motor vehicle, having a circuit board on which the antenna is constructed in the form of conductor tracks on both the upper surface and lower surface of the circuit board.

One antenna which is known from German Patent DE 37 21 822 C1 has a semiconductor body as a printed circuit board, on which a conductor track is constructed concentrically and spirally on the circuit board. The conductor track is disposed on only one surface of the circuit board.

Other antennas which are known from German Published, Non-Prosecuted Patent Application DE 42 05 084 A1 and German Utility Model DE 91 15 582 U1 have conductor tracks on both the top and bottom of the circuit board. The ends of the conductor tracks are connected to one another by plated-through holes in such a way that a series-connected "longer" antenna is created. Interference signals are suppressed more strongly because of the structure of those antennas.

An antenna which is known from German Published, Non-Prosecuted Patent Application DE 43 02 387 A1 has conductor tracks on both the top and bottom of a circuit board. However, the conductor tracks are connected electrically to one another through an external reinforcement frame.

SUMMARY OF THE INVENTION

It is accordingly an object of the invention to provide an antenna, in particular for an anti-theft system of a motor vehicle, which overcomes the hereinafore-mentioned disadvantages of the heretofore-known devices of this general type, which is constructed compactly and with which broadcasting at the highest possible power can be carried out.

With the foregoing and other objects in view there is provided, in accordance with the invention, an antenna assembly for an anti-theft system of a motor vehicle, comprising a circuit board having upper and lower surfaces; an antenna constructed as conductor tracks disposed on both the upper surface and the lower surface of the circuit board; and the circuit board having plated-through holes formed therein at short intervals along the conductor tracks, the conductor tracks connected to one another through the plated-through holes.

In the antenna assembly of the invention, at least one conductor track is disposed on each of the upper and lower surfaces of a circuit board, and they are electrically connected to one another through plated-through holes. This creates a greater radiation density in the antenna, so that a higher radiation power can be broadcast or received by the antenna which is constructed as a conductor track.

In accordance with another feature of the invention, the circuit board has a substrate, and the conductor tracks are thin electrically conductive layers lining the substrate.

In accordance with a further feature of the invention, the conductor tracks are disposed linearly, in a U or in a spiral on the circuit board.

In accordance with an added feature of the invention, the conductor tracks on the upper surface of the circuit board cover the conductor tracks on the lower surface of the circuit board, as seen in a vertical projection.

In accordance with an additional feature of the invention, the circuit board is a multilayer circuit board.

In accordance with a concomitant feature of the invention, the conductor tracks are connected to at least one of a transmitter unit and a receiver unit of an anti-theft system disposed on a portable key.

Other features which are considered as characteristic for the invention are set forth in the appended claims.

Although the invention is illustrated and described herein as embodied in an antenna, in particular for an anti-theft system of a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Antennas broadcast electromagnetic energy as a consequence of high-frequency oscillations in the antenna and receive electromagnetic energies. Antennas for anti-theft systems for motor vehicles are typically disposed on one hand in portable transmitters, for instance on a key or a card, and on the other hand in receivers in the motor vehicle.

Figure 1:
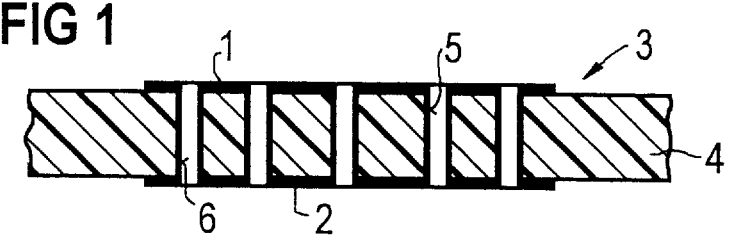
FIG. 1 is a fragmentary, diagrammatic, sectional view of a circuit board having an antenna according to the invention.

Referring now to the figures of the drawings in detail and first, particularly, to FIG. 1 thereof, there are seen antennas which are constructed as so-called "on-board antennas" in the form of conductor tracks 1, 2 on circuit boards 3.

The antennas are connected to non-illustrated transmitter or receiver units, which generate a high-frequency oscillation to be transmitted or to which a received high-frequency oscillation is delivered. The conductor tracks 1, 2 act as oscillator circuits or resonators, by way of which the electrical oscillation is converted into an electromagnetic radiation, and vice versa.

The conductor tracks 1, 2 on the circuit board 3 are constructed as metal layers in the form of linings on both the upper and lower surfaces of a circuit board substrate 4. Preferably, copper, aluminum, gold or silver is used as the material for the conductor tracks.

According to the invention, the conductor track 1 on the upper surface of the substrate 4 is electrically connected over the shortest path to the conductor track 2 on the lower surface through plated-through holes 5. The high-frequency current of the oscillation arriving from a transmitting unit then flows through the conductor tracks 1 on the upper surface, the plated-through holes 5 and the conductor tracks 2 on the lower surface. As a result, the effective electrical length or the effective electrical surface area on the antenna is increased. Consequently, a greater electromagnetic field is broadcast or received, and the power thereof is increased substantially over only a single conductor track on one surface of the circuit board 3.

The radiation power with the structure of the antenna shown in FIG. 1 is approximately doubled as compared with a single conductor track. If no greater transmission power is required then advantageously the supply voltage of the transmitter unit can be reduced so that the same radiation power is still obtained as in the case of an antenna with a single conductor track on only one surface of the substrate 4.

If the antenna is used in a portable transmitter of an anti-theft system, its dimensions should be as small as possible. Small dimensions of the circuit board 3 can be attained if the substrate 4 has a thickness in the range of approximately 1 mm. The thickness of the conductor tracks 1, 2 is approximately 35 μm. The plated-through holes are disposed along the conductor tracks 1, 2 at intervals of approximately 3 mm. The length of the conductor tracks 1, 2 is adapted to the wavelength λ (or integral fractions λ/n or integral multiples n*λ). The high-frequency radiation has a frequency of approximately 433 MHz, which leads to a radiation with wavelengths λ in the decimeter wavelength range. If the transmitter is supplied with 3 V, for instance, then with such an antenna a radiation power of approximately 10 μW can be attained. The radiation power is greater with the antenna according to the invention than in an antenna without plated-through holes.

The antennas according to the invention act like hairpin resonators, in which the broadcasting of the electromagnetic energy occurs along the surface of the conductor tracks 1, 2. In the examples shown, the electromagnetic field lines are emitted (or received) primarily along the conductor tracks 1, 2 in the direction of the receiver (or transmitter). As a result of the plated-through holes 5 and the conductor track 2 on the other surface of the circuit board 3, the effective antenna surface area in the operative direction is increased, so that a greater radiation density is attained. The radiation power accordingly increases as well.

Figure 2:
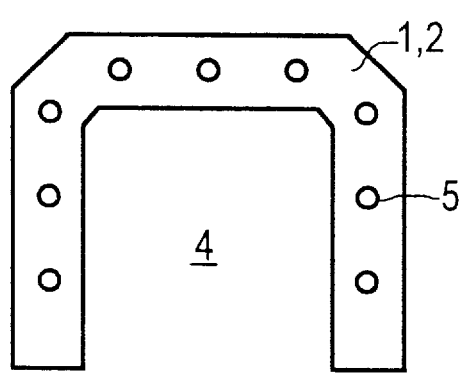
FIG. 2 is a plan view of the circuit board of FIG. 1.
Figure 3:
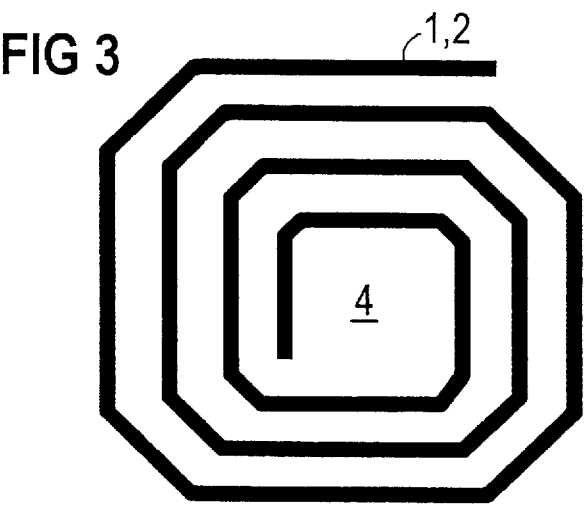
FIG. 3 is a plan view of a further exemplary embodiment of an antenna according to the invention.

The conductor tracks 1, 2 are disposed parallel to one another. A vertical projection or plan view, as is the case in FIGS. 2 and 3, shows that the conductor track 1 on the upper surface is located parallel to the conductor track 2 on the lower surface. That is, the one conductor track 1 is virtually covered by the other conductor track 2. The two conductor tracks 1, 2 thus have an approximately identical geometrical shape. The two conductor tracks 1, 2 are electrically connected to one another over the shortest path through the plated-through holes 5.

The conductor tracks 1, 2 may assume various geometrical shapes. The shape depends on the operative direction, that is the direction in which electromagnetic energy is to be broadcast. Therefore, the conductor tracks 1, 2 may be constructed linearly (in striplike form), in a U (as shown in FIG. 2) or spirally (as shown in FIG. 3) on the circuit board 3. The geometrical shapes of the conductor tracks 1, 2 determine the directional characteristic (reception and broadcasting characteristic) of the antenna.

Therefore, the conductor tracks 1, 2 may also have non-illustrated semicircular or rectangular detour lines, which may be disposed multiply at intervals along the conductor tracks 1, 2 and by which the electrical length of the antenna is increased.

In the case of the invention, however, the shape of the conductor tracks 1, 2 is not essential. What is essential is only the fact that the conductor tracks 1, 2 are disposed on both the upper and lower surfaces of the substrate 4 and are electrically connected to one another through plated-through holes 5. The plated-through holes 5 are disposed along the conductor tracks 1, 2, each at short intervals. As a result, a compact antenna with high broadcasting power can be created in the smallest possible space.

FIG. 1 shows a two-layer circuit board 3. However, multilayer circuit boards may also be used in which conductor tracks are likewise disposed in the substrate 4 parallel to the conductor tracks 1, 2 on the upper and lower surfaces. This further increases the electrical surface area of the antenna.

The antenna of the invention is preferably used as a transmitting antenna in an anti-theft system for a motor vehicle. The antenna is then located on a small circuit board 3 that is disposed in a head or grip of a key. The antenna is connected to a transmitter unit, by way of which a code signal is transmitted to the receiver in the motor vehicle, after a button on the key is actuated. The antenna may also be used as a receiving antenna. In that case it receives signals from transmitter in the motor vehicle and carries them on to a receiver unit in the key.

The term "plated-through holes" in a circuit board is understood to mean metallizings of holes 6 (see FIG. 1) in the circuit board that connect the conductor tracks 1 on the upper surface to the conductor tracks 2 on the lower surface over the shortest possible path. The holes 6 may be entirely filled with electrically conductive material, or it is possible for only the wall of the holes to be constructed as a metal layer.

We claim:

1. An antenna assembly for an anti-theft system of a motor vehicle, comprising:

a circuit board having upper and lower surfaces;

an antenna constructed as conductor tracks disposed on both said upper surface and said lower surface of said circuit board for increasing radiation power to be broadcast or received by the antenna; and said circuit board having plated-through holes formed therein at short intervals along said conductor tracks, said conductor tracks connected to one another through said plated-through holes.

2. The antenna assembly according to claim 1, wherein said circuit board has a substrate, and said conductor tracks are thin electrically conductive layers lining said substrate.

3. The antenna assembly according to claim 1, wherein said conductor tracks are disposed linearly on said circuit board.

4. The antenna assembly according to claim 1, wherein said conductor tracks are disposed in a U on said circuit board.

5. The antenna assembly according to claim 1, wherein said conductor tracks are disposed in a spiral on said circuit board.

6. The antenna assembly according to claim 1, wherein said conductor tracks on said upper surface of said circuit board cover said conductor tracks on said lower surface of said circuit board, as seen in a vertical projection.

7. The antenna assembly according to claim 1, wherein said circuit board is a multilayer circuit board.

8. The antenna assembly according to claim 1, wherein said conductor tracks are connected to at least one of a transmitter unit and a receiver unit of an anti-theft system disposed on a portable key.

* * * * *